Patented Nov. 11, 1924.

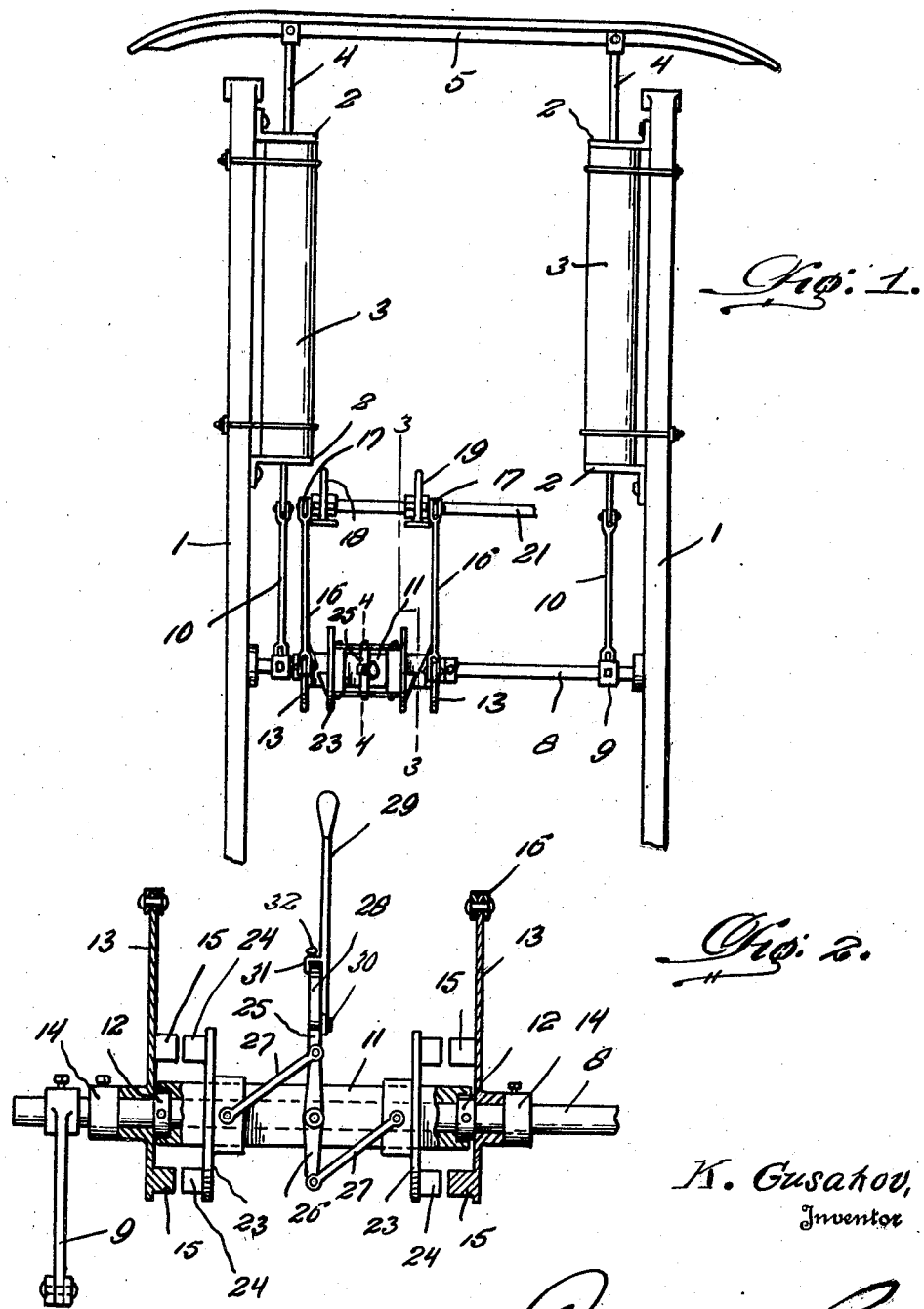

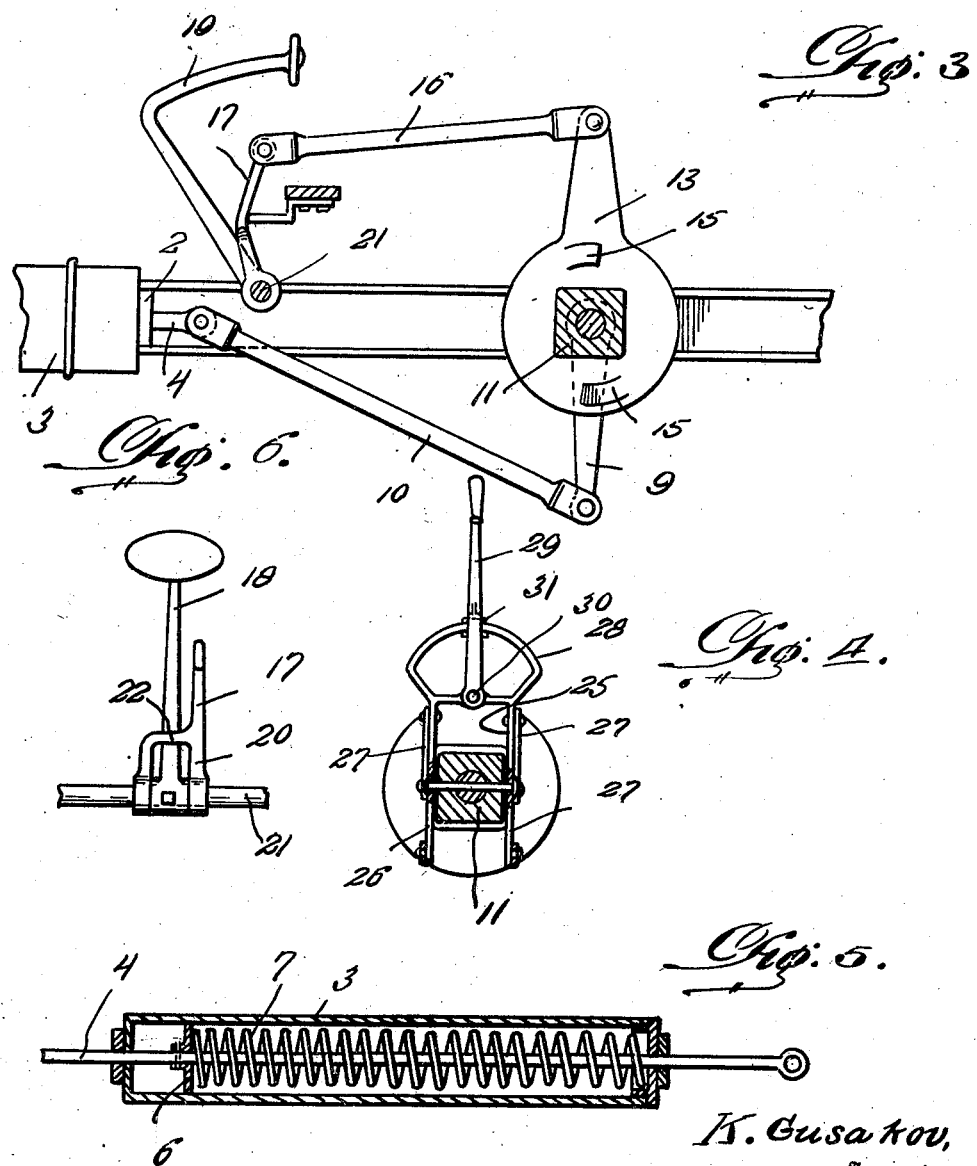

1,515,035

UNITED STATES PATENT OFFICE.

KUPRIAN GUSAKOV, OF LACKAWANNA, NEW YORK.

BUMPER-OPERATED CLUTCH RELEASE AND BRAKE APPLICATOR FOR AUTOMOBILES.

Application filed March 13, 1924. Serial No. 698,967.

*To all whom it may concern:*

Be it known that I, KUPRIAN GUSAKOV, a citizen of the United States, residing at Lackawanna, in the county of Erie and State of New York, have invented certain new and useful Improvements in Bumper-Operated Clutch Releases and Brake Applicators for Automobiles, of which the following is a specification.

This invention relates to improvements in bumper operated means for actuating the clutch pedals of an automobile for releasing the clutch and applying the brake.

An object of the invention resides in providing a pair of rods in spaced parallel relation on the frame bars of an automobile, having a resilient means for normally projecting said rods to a forward limit of movement, said rods mounting a bumper in advance of the vehicle, and a disengageable connection between said rods and the clutch and brake pedals of said automobile, for effecting the operation thereof to release the clutch and apply the brake upon the rearward movement of said rod through the engagement of the bumper with an object in front of the vehicle.

Another object of the invention resides in providing a pair of spaced parallel rods mounting a bumper at the forward end thereof in front of a vehicle, said rods being mounted for slidable movement by suitable means connected with the frame bars of a vehicle, and normally projected forwardly by a resilient means connected with said rod, a shaft being rotatably mounted between said frame bars in the rear of said rods and adapted for rotation thereby through suitable crank connections, corresponding clutch and brake operating members mounted on said shaft and having connection with the clutch and brake pedals of said automobile, an oppositely movable clutch member adapted to be manually operated for setting said clutch members in cooperative relation with the clutch operating members so that a rearward movement of the bumper will effect a release of the clutch and an application of the brake through the operation of corresponding pedals.

The invention also comprehends improvements in the details of construction and arrangement of parts, which are more particularly pointed out in the following description and claims directed to a preferred form of the invention, it being understood, however, that variations in the specific construction and arrangement of the parts may be made without departing from the spirit and scope of the invention as described, and claimed.

In the drawings, forming a part of this application:

Figure 1 is a plan view of a portion of the automobile, showing the invention applied thereto.

Figure 2 is a detail showing, on an enlarge scale, the operating shaft and the parts carried thereby, portions being shown in section.

Figure 3 is a longitudinal sectional view taken on the line 3—3 of Figure 1.

Figure 4 is a sectional view through the operating shaft, taken on the line 4—4 of Figure 1.

Figure 5 is a longitudinal sectional view through the tubular spring housing and mounting for the parallel rods.

Figure 6 is a detail view, illustrating one of the foot pedals and the operating member therefor.

The chassis bars of an automobile of any suitable type are indicated at 1, and mount the pairs of angle brackets 2 on the inner sides thereof, between which are mounted tubular housings 3, which are adapted to receive and slidably mount a pair of rods 4, in spaced parallel relations between the chassis bars 1, mounting a bumper 5 at the forward ends thereof adapted to be normally projected forwardly of the vehicle. Within the housing 3, the rods 4 are provided with annular discs 6 rigidly mounted thereon and forming abutments for coil springs 7, normally under compression between the plates 6 and the rear end of the housing 3, for normally holding the rods 4 in projected position forwardly of the vehicle, so that a rearward movement of said rods may be utilized for a purpose to be described.

An operating shaft 8 is rotatably mounted in suitable bearings carried by the chassis bars 1 and extending transversely relative thereto, in the rear of the housings 3 as clearly shown in Figure 1. A pair of crank arms 9 is mounted on the shaft 8 adjacent the ends thereof, and the chassis bars 1, in line with the ends of the rods 4, the crank arms normally projecting downwardly from said operating shaft and having link connections 10 with the ends of the rods 4, so that a movement of said rods through the brackets 2 will operate the crank arms to rotate the shaft 8. A block member 11 is mounted for rotation with the shaft 8 and is of square cross section, being retained on the shaft 8, by suitable collars indicated at 12, adjacent the ends of which are mounted a pair of operating arms 13 for relative rotation on the shaft which are retained in position by suitable collars or the like indicated at 14, the opposed faces of the arm being arranged with diametrically opposite concentric cam projections on opposed faces, indicated at 15, while the upper free ends of the arms are provided with link connections 16 having the other ends connected with suitable engaging members 17, adapted to engage the clutch and brake pedals of the automobile indicated at 18 and 19 respectively. The engaging members 17 comprise a lever having a forked end as indicated at 18, adapted for mounting on the pedal supporting shaft 21, and receiving the end of the foot pedal between the ends of said levers, as clearly shown in Figure 6, so that the transverse portion 22 of the lever will engage the shank of the foot lever, so that the movement of the engaging member 17 will operate the foot lever in one direction. Suitable connections between the clutch pedal 18 and brake pedal 19 are provided in the usual manner with the clutch and brake operating mechanism, which are not shown.

A pair of clutch discs 23 are slidably mounted on the block member 11, and are provided with cam projections 24 arranged in concentric relation thereon, for cooperation with the cams 15 on the operating levers 13. A yoke member indicated at 25, has the legs 26 thereof pivotally mounted in the central portion to the blocks 11, links 27 pivotally connected with the clutch disc 24 being connected at the opposite ends with the legs 26 of the yoke member 25 at opposite sides of the pivotal connection with the block member, so that a rocking movement of the yoke member on the pivot in one direction, will project the disc toward the operating lever 13 to cause a cooperation between the cams 15 and 24, while a movement of the yoke member in the opposite direction, will withdraw the clutch disc from connection with said operating levers. An arcuate rim 28 is provided on the upper end of the yoke member, and an operating handle 29 is pivotally connected at 30, on the upper end thereof, for movement in concentric relation with the arcuate rim 28, the lever being provided with an angular extension 31 carrying a set screw 32 for cooperation with the arcuate rim to set the lever in a desired position thereon.

The handle 29 extends into proximity of the driver's position, when driving the vehicle equipped with this structure, so that when the vehicle is started, and at all times thereof, the clutch disc 24 may be projected by a suitable operation of the handle 29, to place the projection 24 thereof into cooperative engagement with the cam projections 15 on the operating levers 13. In this position, it will be clear that should the bumper of the vehicle engage an object with a substantial force, a rearward movement thereof will be effected for moving the rods 4 rearwardly through the housing 3, which will effect a corresponding movement of the crank arm 9 through the operation of links 10, and a rotation of the shaft 8 and block member 11. This rotation of the block member 11 will cause the cam projections 24 and the plates 23 to engage the cam projections 15 and cause a corresponding rotating movement of the operating arms 13, which through the link connections 16 will operate the engaging member 17, and move the foot pedals 18 and 19 forwardly on the supporting shaft 21, which will operate the clutch and brake in a well known manner, so that the clutch will be disconnected and the brake operated to stop the vehicle. After this operation is completed, when the vehicle comes to a stop, it will be apparent that a manuel operation of the handle 29 will disconnect the cam projections 24 from the cam projections 15 by moving the plates toward each other on the block member 11, to a position substantially shown in Figure 2, whereupon the clutch pedal and the brake pedals 18 and 19 respectively, will be returned to their normal positions by the usual spring adapted to actuate them, the operating arms 13 also being returned to a normal position under the action of the clutch and brake pedal, while the spring 7 in the housing 3 will operate the rods 4 to project the bumper to its normal position in front of the vehicle, and return the remaining parts to the normal position, ready for a subsequent operation, after the clutch plates are moved to place the cam projections in cooperative relation for a subsequent operation to release the the clutch and apply the brake.

From the above description, it will be clear that a simple and efficient construction has been provided, which is manually controllable, for connecting suitable mechanism for operation of the clutch and brake pedals by the bumper when an object engaged thereby pushes the bumper rearwardly toward the vehicle.

What is claimed is:

1. A device of the class described, comprising an operating shaft rotatably mounted transversely of an automobile, a bumper mounted for sliding movement longitudinally of the vehicle, connections between the bumper and said operating shaft for effecting a rotation of said shaft in the sliding movement of the bumper, operating arms relatively movable on said shaft, connections between said arms and the clutch and brake operating pedals of said vehicle, adapted to operate said pedals in an operation of the arms, and manually disengageable means for connecting or disconnecting the said arms for operation by said shaft.

2. A device of the class described comprising an automobile having frame bars, and clutch and foot pedals for operating the corresponding mechanism of said vehicle, an operating shaft rotatably mounted between the side bars of said automobile, a pair of rods slidably mounted in spaced parallel relation on said automobile and projecting forwardly thereof, a bumper mounted on the forwardly projecting ends of said rods, means for normally projecting the rods forwardly of the vehicle, connections between said rods and said shafts for producing a rotation of the shaft in the rearward movement of the rod through engagement of an object with the bumper, a pair of arms mounted in spaced parallel relation on said operating shaft and adapted to rotate relatively thereto, connections between the said arms and the clutch and brake operating pedals respectively, a pair of clutch plates slidably mounted on said shaft, and adapted to rotate therewith, and manually operated means mounted on said shaft for said clutch plate adapted to project said plates in the cooperation of the operating arm whereby the clutch and brake pedals will be operated for releasing the clutch and applying the brake of the automobile upon the rearward movement of the bumper, when said clutch plates are engaged with the operating arm.

3. In a device of the class described wherein an automobile includes chassis bars, and a clutch and brake pedal operable for operating the mechanism of the automobile, including housings mounted on said chassis bars, a pair of rods slidably mounted in said housings in spaced parallel relation, the forward ends of the rods projecting forwardly of the vehicle, a bumper mounted on the ends of said rods in front of the vehicle, means in said housing for normally projecting the rods to a forward limit of movement relative to said vehicle, an operating shaft rotatably mounted in said frame bars, connections between said operating shafts and said rods for producing a rotary movement of the shaft in the sliding movement of the rods, a block member rigidly mounted on said operating shaft for producing a rotary movement of the shaft in the sliding movement of the rod, a block member rigidly mounted on said operating shaft and having a square cross section, a pair of operating arms rotatably mounted on said shaft adjacent the end of the block member, and in parallel relation, connections between said operating arms and the clutch and brake pedals respectively, said operating arms having cam projections arranged in concentric relation in said operating shaft on the opposed faces thereof, a clutch face slidably mounted on said block member and formed with cam projections for cooperation with the cam projections of the operating plates, a yoke member pivotally mounted intermediate the ends on said block member between said clutch plates, link connections between opposite ends of said yoke member and respective clutch plates, and a handle movably mounted on the yoke member adapted for operating said member for projecting said plates into cooperative relation with the operating plates for retracting them therefrom, whereby a rearward sliding movement of the rod and bumper will rotate said shaft and cause a corresponding rotation of the block member thereon and the operating plate for operating the clutch pedal and the brake pedal respectively, for releasing the clutch and applying the brake of the vehicle, the cam projections on the clutch plates and operating levers cooperating in effecting this operation.

In testimony whereof I affix my signature.
KUPRIAN GUSAKOV.